United States Patent
Stadler

(10) Patent No.: US 11,913,620 B2
(45) Date of Patent: Feb. 27, 2024

(54) ILLUMINATION DEVICE FOR MOTOR VEHICLE HEADLIGHT OR MOTOR VEHICLE

(71) Applicant: ZKW Group GmbH, Wieselburg (AT)

(72) Inventor: Manuel Stadler, Hofamt Priel (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/205,656

(22) Filed: Jun. 5, 2023

(65) Prior Publication Data
US 2023/0392766 A1    Dec. 7, 2023

(30) Foreign Application Priority Data
Jun. 7, 2022  (EP) .................................... 22177611

(51) Int. Cl.
*F21S 41/64* (2018.01)
*F21S 41/265* (2018.01)
*F21S 41/153* (2018.01)
*F21S 41/143* (2018.01)

(52) U.S. Cl.
CPC ........... *F21S 41/645* (2018.01); *F21S 41/143* (2018.01); *F21S 41/153* (2018.01); *F21S 41/265* (2018.01)

(58) Field of Classification Search
CPC ...... F21S 41/645; F21S 41/265; F21S 41/143; F21S 41/153
See application file for complete search history.

(56) References Cited

U.S. PATENT DOCUMENTS

| 10,066,799 | B2 * | 9/2018 | Bhakta | F21S 41/675 |
| 10,859,227 | B2 * | 12/2020 | Toko | F21S 41/25 |
| 11,230,225 | B1 | 1/2022 | Stefanov-Wagner | |
| 2016/0077402 | A1 * | 3/2016 | Takehara | F21S 41/645 349/33 |
| 2023/0056771 | A1 * | 2/2023 | Miu | F21S 41/645 |
| 2023/0070403 | A1 | 3/2023 | Syre et al. | |

FOREIGN PATENT DOCUMENTS

WO     2021052661 A1    3/2021

OTHER PUBLICATIONS

Extended European Search Report Issued in EP Patent Application No. 22177611.5, dated Nov. 28, 2022 (9 Pages).

* cited by examiner

*Primary Examiner* — Matthew J. Peerce
(74) *Attorney, Agent, or Firm* — Eversheds Sutherland (US) LLP

(57) ABSTRACT

Illumination device for a motor vehicle headlight, which is configured to perform at least two different light functions and has an illuminant and an optical device associated with the illuminant, wherein the optical device has an adjustment means configured to adjust operating states of the optical device, wherein in a first operating state, the optical device is substantially transparent, and in a second operating state, the optical device is configured to scatter, wherein the illuminant comprises a plurality of light sources spaced apart from one another at a minimum distance, wherein the adjustment means is configured to adjust the optical device such that in the first operating state, a light propagation direction of the rays of light remains unchanged, and in the second operating state, the light propagation direction of the rays of light is changed by scattering the rays of light on scattering elements of the optical device.

18 Claims, 2 Drawing Sheets

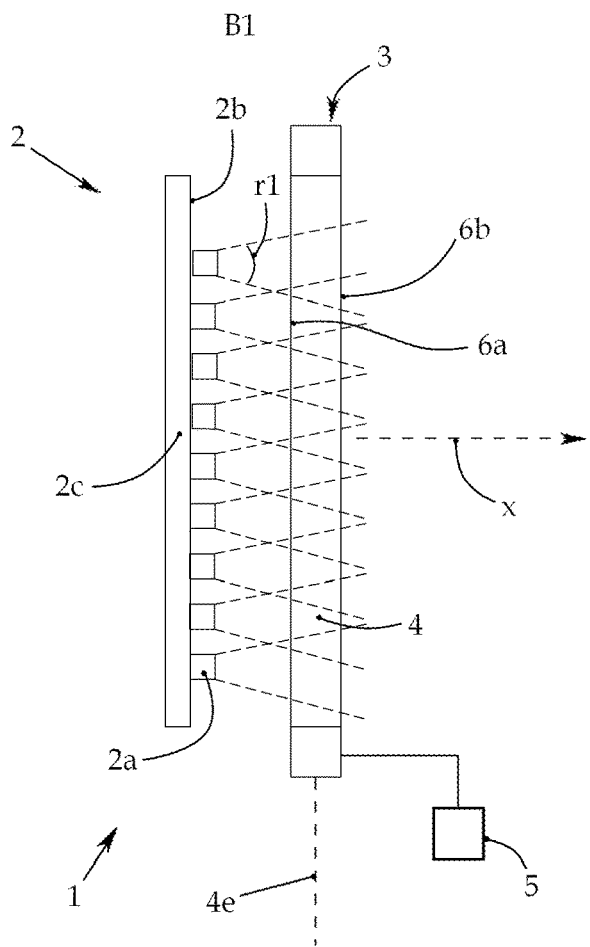 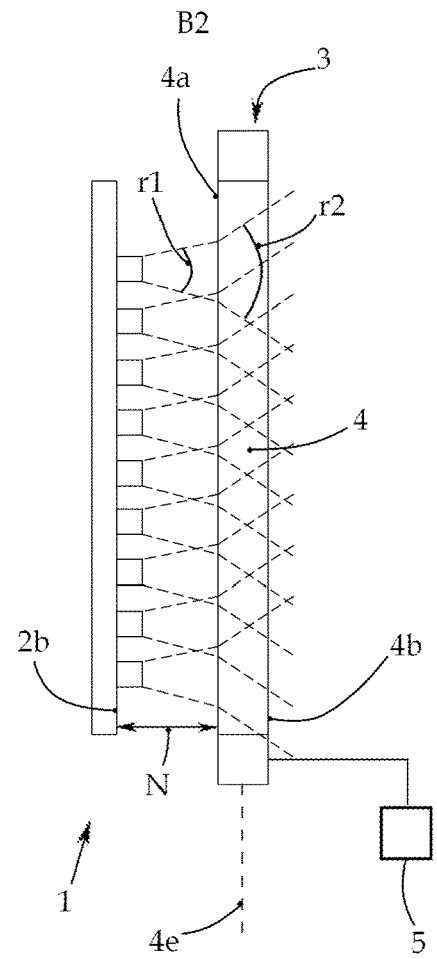
Fig. 1　　　　　Fig. 2
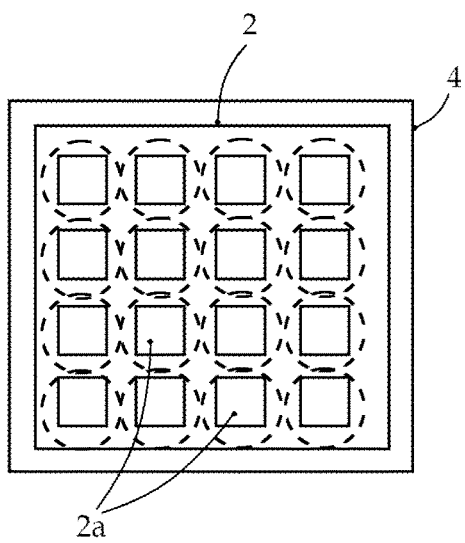 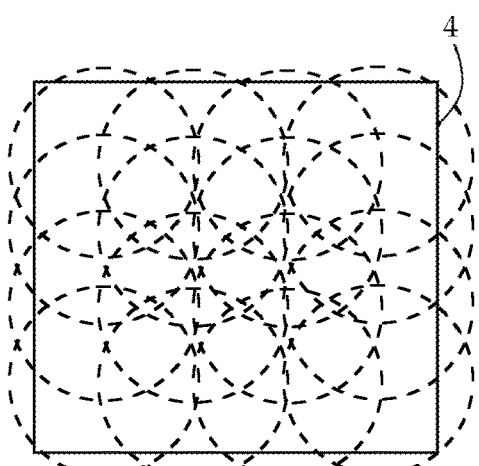
Fig. 1a　　　　　Fig. 2a

ILLUMINATION DEVICE FOR MOTOR VEHICLE HEADLIGHT OR MOTOR VEHICLE

CROSS-REFERENCE TO RELATED APPLICATIONS

This application claims priority to European Patent Application No. 22177611.5, filed Jun. 7, 2022, which is incorporated herein by reference.

FIELD OF THE INVENTION AND DESCRIPTION OF PRIOR ART

The invention relates to an illumination device for a motor vehicle headlight or a motor vehicle, wherein the illumination device is configured to perform at least two different light functions and has an illuminant and an optical device associated with the illuminant,
   wherein the illuminant is configured to generate light and emit the generated light onto the optical device,
   wherein the optical device has an optically active region with an optical axis, wherein the optically active region has a light entry surface and a light emitting surface opposite the light entry surface, wherein light emitted by the illuminant enters the optically active region of the optical device via the light entry surface, passes through the optically active region of the optical device and exits the optically active region of the optical device via the light emitting surface, wherein the optical device has an adjustment means, which is configured to adjust operating states of the optical device, wherein at least two different operating states of the optical device are provided, wherein in a first operating state, which is a transmission state, the optically active region of the optical device is substantially transparent such that the light of the illuminant incident on the optically active region of the optical device passes through the optically active region substantially free of interaction with the optically active region and forms a first light function, and in a second operating state, which is a scattering state, the optically active region of the optical device is configured to scatter such that the light of the illuminant incident on the optically active region of the optical device interacts with the optically active region when passing through the optically active region to form a second light function.

The invention further relates to a motor vehicle headlight with an illumination device.

Generic illumination devices are known in the prior art. The possibility of performing a plurality of different light functions with the same illumination device is usually limited as different light functions require differently configured lighting components. Therefore, several illumination devices are usually installed together in a headlight, wherein each illumination device produces a specific light function. However, the use of several illumination devices increases the production costs of the headlight and space requirements within the headlight.

SUMMARY OF THE INVENTION

It is therefore an object of the present invention to mitigate or eliminate the disadvantages of the prior art. The objective of the invention is therefore in particular to create an illumination device that improves the performance of several light functions.

According to the invention, the illuminant comprises a plurality of light sources spaced apart from one another at a minimum distance, which are arranged in a light source surface, preferably uniformly, distributed on a light source support of the illuminant, wherein each light source emits a light beam,
   wherein the optically active region between the light entry surface and the light emitting surface has a plurality of scattering elements, wherein the adjustment means is configured to adjust a scattering cross section of the scattering elements depending on the at least two operating states,
   wherein the adjustment means is configured to adjust the optical device in such a way that in the first operating state, the scattering cross section of the scattering elements of the optically active region is set in such a way that a light propagation direction of the rays of light of the light beams remains substantially unchanged when passing through the optically active region such that merely the light beams emanating from the light sources define the first light function, and in the second operating state, the scattering cross section of the scattering elements of the optically active region is set in such a way that the light propagation direction of the rays of light of at least one first group of light beams, in particular of all light beams, is changed by scattering the rays of light by the scattering elements, wherein in the second operating state, the scattered light beams emitted by the light sources and subsequently emanating from the light emitting surface of the optically active region define the second light function.

This results in the advantage that the light function (or light functions) that can be performed in the second operating state is defined by the light beams emitted by the light sources and interacting with the scattering elements of the optically active region, wherein the light beams, which are respectively emitted by a light source of the illuminant, are in particular substantially broadened or widened in the second operating state when passing through the optically active region. In particular, in the first operating state, the individual light sources are recognizable to an observer (who is looking at the light emitting surface of the optical device) or the individual positions of adjacent light sources on the light source support are distinguishable to the observer as the optical device is operated in the transparent operating state. In contrast, in the second operating state, the individual light sources are indistinguishable to the observer owing to the interaction or scattering of the light beams on the optically active region (or on the scattering elements located therein). In the second operating state, the observer can recognize substantially uniform or homogeneous lighting of the entire light emitting surface when looking at the light emitting surface, but cannot recognize the individual light sources behind the optical device. In this way, for example, a light function that is clear to an observer can be produced in the first operating state and a light function that is blurred to an observer can be produced in the second operating state. The terms "clear" and "blurred" describe states of light functions in this disclosure that can be visually perceived by an observer of the illumination device. In particular, "clear" means that the positions of the individual light sources of the illuminant are distinguishable to the observer when looking at the illumination device. Conversely, "blurred" means that the positions of the individual light sources of the illuminant and their (flat) arrangement on the light source support are not distinguishable to the observer when looking at the illumination device. Thus, when the illumination device is operated in the second operating state, the observer can only recognize a single (blurred or out-of-focus) luminous surface (the light emitting surface of the optical device), and in the first operating state, they can recognize the individual illuminating light sources. The minimum distance between two adjacent light sources can be larger than 0 mm, preferably larger than 1 mm, larger than 3 mm, larger than 5 mm or larger than 10 mm. An area or surface is in particular optically active within the meaning of this disclosure if it changes the direction of the light passing through the surface during intended use with respect to its direction and/or its beam characteristics. A surface through which no light should pass in accordance with intended use is in particular not optically active within the meaning of this disclosure. Scattering cross section within the meaning of this disclosure can be understood as the strength of the scattering of light rays by the scattering elements. Scattering can be understood as deflection relative to the direction of incidence of incident rays of light as they pass through the optically active region. In particular, the rays of light are not scattered in the first operating state and are scattered in the second operating state. The first light function and second light function within the meaning of this disclosure are understood in particular as light functions that can be consciously recognized/perceived by an observer of the optical device. These are not so much light functions that are projected in a traffic area, but rather light functions that are viewed by an observer in order to inform and/or alert them. In particular, the first light function comprises neither a dipped beam nor a full beam in the motor vehicle area.

It can be provided that rays of light from each light beam form a defined light cone, which, starting from the light source emitting the light beam, spans a first solid angle, wherein as a result of scattering the rays of light of the light cone by the scattering elements, the light propagation direction of the rays of light is changed in such a way that after passing through the optically active region, the rays of light of the light cone span a second solid angle, which is larger than the first solid angle. The defined light cones are freely definable and can be understood as a mental construct intended to illustrate the optical effect of the optically active region (broadening or expanding of the light beams emitted by the light sources). The size or opening angle (the first solid angle) of the light cones can be freely selectable, wherein, for example, a certain beam angle of the respective light source can be defined as the first solid angle. In the case of directed light sources (e.g. in the case of light-emitting diodes), the beam angle can describe the angle formed by the side points with half the maximum luminous intensity. The individually defined light cones of the light beams can, for example, be configured to be in the shape of a rotary cone or, for example, can be configured as light cylinders through an arrangement of a collimator between the illuminant and the optical device, wherein in the case of light cylinders, the edge light rays span a solid angle of zero degrees and are oriented substantially parallel to one another. In this disclosure, a solid angle is understood to be the three-dimensional counterpart of the two-dimensional angle defined for a plane. The solid angle is in particular defined as an opening angle of a rotary cone and describes that part of a three-dimensional space that lies inside a cone shell of the rotary cone. The rays of light of a light cone can lie within the cone shell, wherein one light source lies at the tip of each cone shell. In particular, the solid angle can be understood as a canonical solid angle (where the base of the cone spanning the solid angle is circular).

It can be provided that the optically active region of the optical device is formed as a liquid crystal lens, which has a liquid crystal layer, in which the scattering elements are accommodated in the form of liquid crystals, wherein the optical axis of the optically active region corresponds to the optical axis of the liquid crystal lens, wherein the orientation of the liquid crystals relative to the optical axis can be adjusted with an electrical voltage that can be applied and varied by the adjustment means in order to change the scattering cross section of the liquid crystals, preferably continuously, when changing between operating states. Liquid crystals are adequately known and are used in a variety of ways in optical elements, such as in LCD displays. Liquid crystal lenses are in particular components in which a liquid crystal layer is arranged between two transparent electrodes. Randomly distributed liquid crystals can be oriented or aligned in a targeted manner within the liquid crystal layer by applying an electrical voltage. For example, the random liquid crystal layer can diffusely scatter light rays striking it. If the liquid crystals are aligned accordingly, there can be, as in the case of the present invention, targeted scattering of rays of light (second operating state) or the rays of light can pass through the liquid crystals unhindered (first operating state).

It can be provided that in the second operating state, the second solid angle is increased in such a way when the optically active region is passed through that the defined light cones of light beams emitted by adjacent light sources at least partially overlap, wherein the overlap is preferably at least 10%, preferably more than 25%, in particular more than 50% or more than 75%. A large overlap has the advantage that the second light function has a particularly homogeneous brightness for an observer per light emitting surface (of the optically active region).

It can be provided that a normal distance between a main plane of the optically active region of the optical device and the light source surface of the light sources is substantially the same in the first operating state and second operating state of the optical device, wherein the main plane of the optically active region is preferably arranged relative to the illuminant in such a way that the main plane of the optically active region and the light source surface of the light sources are oriented substantially parallel to one another. This results in the advantage that the illumination device can be configured to be particularly compact. The main plane of the optically active region of the optical device can in particular be oriented parallel to the light entry surface and/or light emitting surface of the optically active region. The illuminant and the optical device can in particular be arranged in a fixed position relative to one another in the various operating states and also during the transition between operating states.

It can be provided that the light sources are LEDs.

It can be provided that the light sources are arranged in the light source surface distributed on the light source support in a light source grid, wherein the light sources are in particular arranged along rows and columns of a two-dimensional, preferably uniform, grid, wherein light entry luminous spots or light exit luminous spots of the defined light cones of the light beams are preferably arranged on the light entry surface or light emitting surface in a luminous spot grid corresponding to the light source grid. The corresponding luminous spot grid can in particular have the same grid spacing as the light source grid. A matrix-like arrangement can also be understood as a grid. Parts or sub-groups of light sources can respectively be arranged in two or more different grids, which at least partially overlap, wherein as a result the display options for light functions in the first operating state can be increased. The light sources can be configured the same in terms of their illuminance and/or design or size. The light sources can be distributed on the light source surface according to a light source surface density, wherein the light source surface density is defined as the number of light sources per light source surface. The light source surface density can be consistent over the entire light source surface. The light source surface can have partial regions with a different light source surface density, wherein as a result the display options for light functions in the first operating state can be increased.

It can be provided that the light source support is flat, wherein the light source surface, which is in particular flat, is preferably oriented substantially parallel to the light source support. Advantageously, the illumination device is particularly compact as a result.

It can be provided that the illumination device comprises a light source control device, which is configured to individually control the light sources of the illuminant. This allows a plurality of different light functions to be performed in the first and/or second operating state of the illumination device.

It can be provided that the light sources of the illuminant are formed from at least two light source groups, wherein light sources of a first light source group are arranged in the light source surface on the light source support in a first, preferably uniform, light source grid with a first grid spacing from one another, wherein light sources of a second light source group are arranged in the light source surface on the light source support in a second, preferably uniform, light source grid with a second grid spacing from one another, wherein the first grid spacing is greater than the second grid spacing. A grid can be understood to be a two-dimensional matrix-like arrangement of n times m (n and m represent whole numbers) light sources, wherein there is a certain grid spacing between two adjacent light sources. Due to the fact that the first and second grid spacing can be different, a particularly high variation in the arrangement of the light sources can be achieved, which in turn can increase the variation of the light functions.

It can be provided that the light source control device is configured to control the light sources of the first light source group in such a way that they emit light with a first illuminance and to control the light sources of the second light source group in such a way that they emit light with a second illuminance, wherein the first illuminance is greater than the second illuminance. Advantageously, the overall light impression of the first and second light source group can thus be homogenized for the observer since, for example, the light source group with the larger grid spacing has a greater illuminance compared to the light source group with the smaller grid spacing.

It can be provided that the optically active region of the optical device is formed from at least two optically active partial regions, wherein the adjustment means is configured to operate a first optically active partial region in the first operating state and a second optically active partial region in the second operating state, or to operate the first partial region in a first scattering state and the second partial region in a second scattering state, wherein the scattering cross section of the scattering elements in the first scattering state is different from the scattering cross section of the scattering elements in the second scattering state. Advantageously, a different (clear or blurred) light function can thus respectively be performed with the first optically active partial region and with the second optically active partial region.

It can be provided that the optical device is arranged relative to the illuminant in such a way that the light of the first light source group passes through the first optically active partial region and the light of the second light source group passes through the second optically active partial region.

It can be provided that the first light function is an information transfer light function, by means of which a definable, predeterminable symbol, which is made up of individual illuminating light sources, can be displayed, wherein the second light function is preferably a brake light, a direction indicator light function, a daytime running light, a position light, a tail light or a stop light. The first light function can in particular be a light function that is clear to an observer, wherein the first light function can, for example, be a symbol that is recognizable to an observer and/or readable text. The second light function can be a light function that is blurred to an observer and has no recognizable or readable information content.

A motor vehicle headlight can be provided, comprising an illumination device described above.

It can be provided that the defined light cones of the respective light beams form a light entry luminous spot on the light entry surface of the optically active region and enter the optically active region of the optical device via this light entry luminous spot, wherein the light of a light cone entering via a light entry luminous spot forms a light exit luminous spot on the light emitting surface of the optically active region and exits the light emitting surface of the optically active region of the optical device via this light exit luminous spot, wherein the light sources are configured in such a way that the light entry luminous spots on the light entry surface are substantially the same size and preferably have substantially the same, in particular circular, shape, wherein the light exit luminous spots of the light cones of the light beams after scattering by the scattering elements are preferably larger than their light entry luminous spots. The light sources can have the same design, in particular in terms of their light emission characteristics. The light entry luminous spots of the individual light cones can be regarded as that partial region of the light entry surface that is illuminated by the respective light cone. The light entry luminous spots and the light exit luminous spots of a light cone are preferably substantially opposite.

In the context of this description, the terms "above", "below", "horizontal", "vertical" should be understood as indications of orientation when the illumination device is arranged in its normal position of use after having been fitted to a motor vehicle headlight.

BRIEF DESCRIPTION OF THE DRAWINGS

The invention is outlined in more detail below based on a preferred exemplary embodiment, to which it is, however, not limited. In the drawings:

FIG. 1 shows a schematic view of an illumination device according to the invention in a first operating state;

FIG. 1a shows a front view of the illumination device according to FIG. 1;

FIG. 2 shows a schematic view of an illumination device according to the invention in a second operating state;

FIG. 2a shows a front view of the illumination device according to FIG. 2;

DETAILED DESCRIPTION OF EMBODIMENTS OF THE INVENTION

Figure 3:
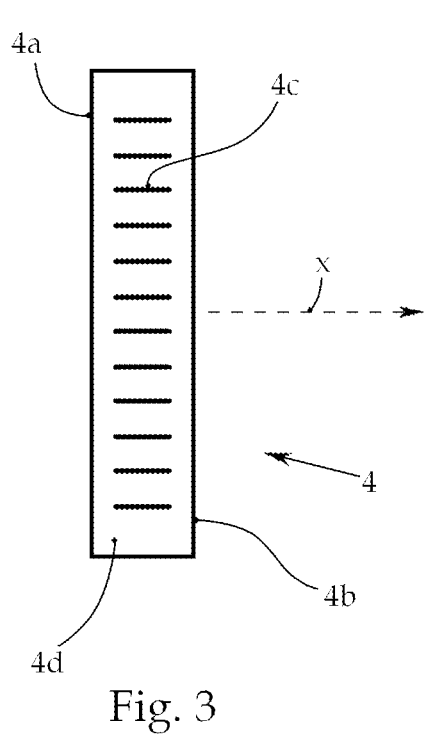
FIG. 3 shows a schematic view of an optically active region of an optical device.

FIG. 1 and FIG. 2 respectively show schematic side views, simplified for a better overview, of an illumination device 1 according to the invention for a motor vehicle headlight or a motor vehicle, wherein in FIG. 1, the illumination device 1 is shown in a first operating state B1, and in FIG. 2, the illumination device 1 is shown in a second operating state B2.

As shown in FIGS. 1 and 2, the illumination device 1 comprises an illuminant 2 and an optical device 3 associated with the illuminant 2. The illumination device 1 is configured to perform or form at least two different light functions B1, B2. The illuminant 2 is configured to generate light and emit the generated light onto the optical device 3 and the optical device 3 has an optically active region 4 with an optical axis x, wherein light emitted by the illuminant 2 passes through the optically active region 4 of the optical device 3 to form different light functions. The illuminant 2 comprises a plurality of light sources 2a spaced apart from one another at a minimum distance, which are arranged in a light source surface 2b, preferably uniformly, distributed on a light source support 2c of the illuminant 2, wherein each light source 2a emits a light beam.

The optically active region 4 has a light entry surface 4a and a light emitting surface 4b opposite the light entry surface 4a, wherein light emitted by the illuminant 2 enters the optically active region 4 of the optical device 3 via the light entry surface 4a, passes through the optically active region 4 of the optical device 3 and exits the optically active region 4 of the optical device 3 via the light emitting surface 4b. The optical device 3 comprises an adjustment means 5 configured to adjusted its various operating states, wherein at least two, preferably three or more, different operating states of the optical device 3 can be adjusted. In the first operating state B1, which is a transmission state, the optically active region 4 of the optical device 3 is substantially transparent. In the first operating state B1, the light of the illuminant 2 incident on the optically active region 4 passes through the optically active region 4 substantially free of interaction with the optically active region 4 and thus forms a first light function. In the second operating state B2, which is a scattering state, the optically active region 4 of the optical device 3 is substantially configured to scatter. In the second operating state B2, the light of the illuminant 2 incident on the optically active region 4 interacts with the optically active region 4 when passing through the optically active region 4 to form a second light function.

FIG. 1a shows a front view of the illumination device 1, wherein the optical device 3 is set in the first (transparent) operating state B1. The individual light sources 2a can therefore be seen through the optical device 3 (or its optically active region 4). The dashed lines arranged in a circle around the individual light sources 2a are intended to symbolise light cones. In the example shown, the illuminant 2 has a total of 16 light sources 2a, which are arranged in a 4×4 grid.

FIG. 2a shows a front view of the illumination device 1, wherein the optical device 3 is set in the second (scattering) operating state B2. The individual light sources 2a can therefore no longer be seen through the optical device 3 (or its optically active region 4). The scattered or widened light beams of the individual light sources 2a leave the optically active region 4, wherein this results in a substantially homogeneously illuminated surface (the light emitting surface 4b of the optically active region 4) for an observer. The overlapping light cones are schematically illustrated as dashed circles.

As shown in FIG. 3, the optically active region 4 between the light entry surface 4a and the light emitting surface 4b has a plurality of scattering elements 4c, wherein the adjustment means 5 is configured to adjust a scattering cross section of the scattering elements 4c depending on the at least two operating states B1, B2. The optically active region 4 of the optical device 3 is formed as a liquid crystal lens in the exemplary embodiment shown, which has a liquid crystal layer 4d, in which the scattering elements 4c are accommodated in the form of liquid crystals. The liquid crystal lenses used here have a liquid crystal layer between two transparent electrodes (light entry surface and light emitting surface), wherein the liquid crystals can be oriented or aligned in a targeted manner within the liquid crystal layer by applying an electrical voltage. The voltage can be regulated by the adjustment means 5. The optical axis x of the optically active region 4 corresponds to the optical axis of the liquid crystal lens. The orientation of the liquid crystals relative to the optical axis x can be adjusted with the electrical voltage that can be applied and varied by the adjustment means 5 in order to change a scattering cross section (or the effective cross section) of the liquid crystals, preferably continuously, when changing between operating states B1, B2.

The adjustment means 5 is configured to adjust the optical device 3 in such a way that in the first operating state B1, the scattering cross section of the scattering elements 4c of the optically active region 4 is set in such a way that a light propagation direction of the rays of light of the light beams remains substantially unchanged when passing through the optically active region 4. Thus, only the light beams emanating from the light sources 2a define the first light function. In the second operating state B2, the scattering cross section of the scattering elements 4c of the optically active region 4 is set in such a way that the light propagation direction of the rays of light of at least one first group of light beams, in particular of all light beams, is changed by scattering the rays of light by the scattering elements 4c. Thus, in the second operating state B2, the scattered light beams emitted by the light sources 2a and subsequently emanating from the light emitting surface 4a of the optically active region 4 define the second light function.

Each light beam forms a light entry luminous spot 6a on the light entry surface 4a of the optically active region 4, and enters the optically active region 4 of the optical device 3 via this light entry luminous spot 6a. The light of a light beam entering via a light entry luminous spot 6a forms a light exit luminous spot 6b on the light emitting surface 4b of the optically active region 4 and exits the light emitting surface 4b of the optically active region 4 of the optical device 3 via this light exit luminous spot 6b. The light sources are configured in such a way that the light entry luminous spots 6a on the light entry surface 4a are substantially the same size and preferably have substantially the same, in particular circular, shape. The light exit luminous spots 6b of the light beams after scattering by the scattering elements 4c are preferably larger than their light entry luminous spots 6a. The light sources 2a of the illuminant 2 are arranged relative to the optical device 3 in the exemplary embodiment shown in such a way that the light entry luminous spots 6a formed by the individual light beams overlap on the light entry surface 4a of the optical region 4 of the optical device 3 less than 15%, preferably less than 10% (the light entry luminous spots 6a can also be overlap-free). In the second operating state B2, the light exit luminous spots 6b of the emanating scattered light beams overlap on the light emitting surface 4b at least partially or the overlap is greater than in the first operating state B1. In the second operating state, the overlap of the light exit luminous spots 6a on the light emitting surface 4a of adjacent scattered light beams can be, for example, at least 10%, preferably more than 25%, in particular more than 50% or more than 75%.

After passing through the optically active region 4, the scattered light beams are in particular wider than the light beams originally emitted by the light sources or unscattered. To put it another way, the outermost edge light rays delimiting the scattered light beams span a second solid angle r2 after scattering by the scattering elements 4c, which angle is greater than a first solid angle r1 of the unscattered light beams.

Figure 4:
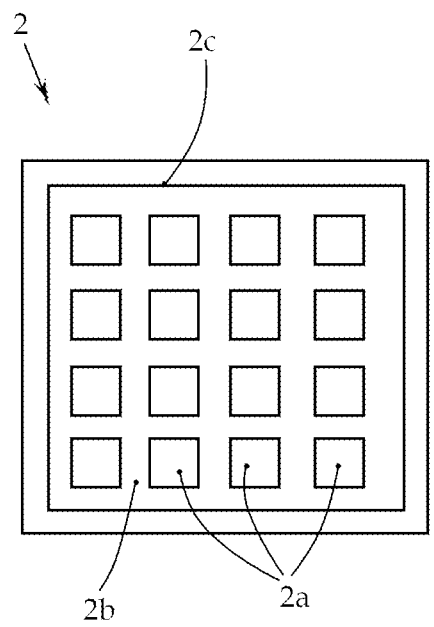
FIG. 4 shows a schematic view of an illuminant.

As shown in FIG. 4, the illuminant 2 comprises a plurality of light sources 2a spaced apart from one another at a minimum distance, which are arranged in a light source surface 2b, preferably uniformly, distributed on a light source support 2c of the illuminant 2. In the exemplary embodiment shown, the light sources 2a are arranged in the light source surface 2b distributed on the light source support 2c in a light source grid. The light sources 2a are in particular arranged along rows and columns of a two-dimensional, preferably uniform, light source grid. Alternatively, the light sources 2a can also, for example, be arranged in an irregular light source grid or according to a Poisson distribution (i.e. substantially irregular or randomly distributed) on the light source support 2c. In the exemplary embodiment shown, the light source surface 2b and the light source support 2c are flat. Furthermore, the light source surface 2b is oriented substantially parallel to the light source support 2c. The light sources 2a can be LEDs. The illumination device 1 can moreover comprise a light source control device (not shown), which is configured to individually control the light sources 2a of the illuminant 2.

In the exemplary embodiment shown, a normal distance N between a main plane 4e of the optically active region 4 of the optical device 3 and the light source surface 2b of the light sources 2a is substantially the same in the first operating state B1 and second operating state B2 of the optical device 3. Furthermore, the main plane 4e of the optically active region 4 is arranged relative to the illuminant 2 in such a way that the main plane 4e and the light source surface 2b are oriented substantially parallel to one another.

The light sources 2a of the illuminant 2 can be formed from at least two light source groups, wherein light sources of a first light source group are arranged in the light source surface 2b on the light source support 2c in a first, preferably uniform, grid with a first grid spacing from one another. Light sources of a second light source group can be arranged in the light source surface 2b on the light source support 2c in a second, preferably uniform, grid with a second grid spacing from one another, wherein the first grid spacing is greater than the second grid spacing. The light source control device can be configured to control the light sources of the first light source group in such a way that they emit light with a first illuminance and to control the light sources of the second light source group in such a way that they emit light with a second illuminance, wherein the first illuminance is greater than the second illuminance.

The optically active region 4 of the optical device 3 can be formed from at least two optically active partial regions, wherein the adjustment means 5 can be configured to operate a first optically active partial region in the first operating state B1 and a second optically active partial region in the second operating state B2, or to operate the first partial region in a first scattering state B2a and the second partial region in a second scattering state B2b. The scattering cross section of the scattering elements 4c in the first scattering state B2a is different from the scattering cross section of the scattering elements 4c in the second scattering state B2b. The optical device 3 can be arranged relative to the illuminant 2 in such a way that the light of the first light source group passes, preferably exclusively, through the first optically active partial region and the light of the second light source group passes, preferably exclusively, through the second optically active partial region.

In the exemplary embodiment shown, the first light function is an information transfer light function, by means of which a definable, predeterminable symbol, which is made up of individual illuminating light sources 2a, can be displayed. The second light function is, for example, a brake light, a direction indicator light function, a daytime running light, a position light, a tail light or a stop light.

The invention claimed is:

1. An illumination device (1) for a motor vehicle headlight or a motor vehicle, wherein the illumination device (1) is configured to perform at least two different light functions, the illumination device comprising:
an illuminant (2); and
an optical device (3) associated with the illuminant (2),
wherein the illuminant (2) is configured to generate light and emit the generated light onto the optical device (3),
wherein the optical device (3) has an optically active region (4) with an optical axis (x), wherein the optically active region (4) has a light entry surface (4a) and a light emitting surface (4b) opposite the light entry surface (4a), wherein light emitted by the illuminant (2) enters the optically active region (4) of the optical device (3) via the light entry surface (4a), passes through the optically active region (4) of the optical device (3) and exits the optically active region (4) of the optical device (3) via the light emitting surface (4b), wherein the optical device (3) has an adjustment means (5), which is configured to adjust operating states of the optical device (3), wherein at least two different operating states of the optical device (3) are provided, wherein in a first operating state (B1), which is a transmission state, the optically active region (4) of the optical device (2) is substantially transparent such that the light of the illuminant (2) incident on the optically active region (4) of the optical device passes through the optically active region (4) substantially free of interaction with the optically active region (4) and forms a first light function, and in a second operating state (B2), which is a scattering state, the optically active region (4) of the optical device (3) is configured to scatter such that the light of the illuminant (2) incident on the optically active region (4) of the optical device interacts with the optically active region (4) when passing through the optically active region (4) to form a second light function,
wherein the illuminant (2) comprises a plurality of light sources (2a) spaced apart from one another at a minimum distance, which are arranged in a 15 light source surface (2b), distributed on a light source support (2c) of the illuminant (2), wherein each light source (2a) emits a light beam, wherein the optically active region (4) between the light entry surface (4a) and the light emitting surface (4b) has a plurality of scattering elements (4c), wherein the adjustment means (5) is configured to adjust a scattering cross section of the scattering elements (4c) depending on the at least two operating states (B1, B2), wherein the adjustment means (5) is configured to adjust the optical device (3) in such a way that in the first operating state (B1), the scattering cross section of the scattering elements (4c) of the optically active region (4) is set in such a way that a light propagation direction of the rays of light of the light beams remains substantially unchanged when passing through the optically active region (4) such that merely the light beams emanating from the light sources (2a) define the first light function, and in the second operating state (B2), the scattering cross section of the scattering elements (4c) of the optically active region (4) is set in such a way that the light propagation direction of the rays of light of at least one first group of light beams, in particular of all light beams, is changed by scattering the rays of light by the scattering elements (4c), wherein in the second operating state (B2), the scattered light beams emitted by the light sources (2a) and subsequently emanating from the light emitting surface (4a) of the optically active region (4) define the second light function, wherein the light sources (2a) of the illuminant (2) are formed from at least two light source groups, wherein light sources of a first light source group are arranged in the light source surface (2b) on the light source support (2c) in a first uniform light source grid with a first grid spacing from one another, wherein light sources of a second light source group are arranged in the light source surface (2b) on the light source support (2c) in a second uniform light source grid with a second grid spacing from one another, wherein the first grid spacing is greater than the second grid spacing, and wherein the optical device (3) is arranged relative to the illuminant (2) in such a way that the light of the first light source group passes through the first optically active partial region and the light of the second light source group passes through the second optically active partial region.

2. The illumination device (1) according to claim 1, wherein rays of light from each light beam form a defined light cone, which, starting from the light source (2a) emitting the light beam, spans a first solid angle (r1), wherein as a result of scattering the rays of light of the light cone by the scattering elements (4c), the light propagation direction of the rays of light is changed in such a way that after passing through the optically active region (4), the rays of light of the light cone span a second solid angle (r2), which is larger than the first solid angle (r1).

3. The illumination device (1) according to claim 1, wherein the optically active region (4) of the optical device (3) is formed as a liquid crystal lens, which has a liquid crystal layer (4d), in which the scattering elements (4) are accommodated in the form of liquid crystals, wherein the optical axis (x) of the optically active region (4) corresponds to the optical axis of the liquid crystal lens, wherein the orientation of the liquid crystals relative to the optical axis (x) can be adjusted with an electrical voltage that can be applied and varied by the adjustment means (5) in order to change the scattering cross section of the liquid crystals when changing between operating states (B1, B2).

4. The illumination device (1) according to claim 1, wherein in the second operating state (B2), the second solid angle (r2) is increased in such a way when the optically active region (4a) is passed through that the defined light cones of light beams emitted by adjacent light sources (2a) at least partially overlap.

5. The illumination device (1) according to claim 1, wherein a normal distance (N) between a main plane (4e) of the optically active region (4) of the optical device (3) and the light source surface (2b) of the light sources (2a) is substantially the same in the first operating state (B1) and second operating state (B2) of the optical device (3), wherein the main plane (4e) of the optically active region (4) is arranged relative to the illuminant (2) in such a way that the main plane (4e) of the optically active region (4) and the light source surface (2b) of the light sources (2) are oriented substantially parallel to one another.

6. The illumination device (1) according to claim 1, wherein the light sources (2a) are LEDs.

7. The illumination device (1) according to claim 1, wherein the light sources (2a) are arranged in the light source surface (2b) distributed on the light source support (2c) in a light source grid, wherein the light sources (2a) are in particular arranged along rows and columns of a two-dimensional grid.

8. The illumination device (1) according to claim 1, wherein the light source support (2c) is flat, wherein the light source surface (2b), which is in particular flat, is oriented substantially parallel to the light source support (2c).

9. The illumination device (1) according to claim 1, comprising a light source control device, which is configured to individually control the light sources (2a) of the illuminant (2).

10. The illumination device (1) according to claim 9, wherein the light source control device is configured to control the light sources of the first light source group in such a way that they emit light with a first illuminance and to control the light sources of the second light source group in such a way that they emit light with a second illuminance, wherein the first illuminance is greater than the second illuminance.

11. The illumination device (1) according to claim 1, wherein the optically active region (4) of the optical device (3) is formed from at least two optically active partial regions, wherein the adjustment means (5) is configured to operate a first optically active partial region in the first operating state (B1) and a second optically active partial region in the second operating state (B2), or to operate the first partial region in a first scattering state (B2a) and the second partial region in a second scattering state (B2b), wherein the scattering cross section of the scattering elements (4c) in the first scattering state (B2a) is different from the scattering cross section of the scattering elements (4c) in the second scattering state (B2b).

12. The illumination device (1) according to claim 1, wherein the first light function is an information transfer light function, by means of which a definable, predeterminable symbol, which is made up of individual illuminating light sources (2a), can be displayed, wherein the second light function is a brake light, a direction indicator light function, a daytime running light, a position light, a tail light or a stop light.

13. A motor vehicle headlight, comprising an illumination device (1) according to claim 1.

14. The illumination device (1) according to claim 1, wherein the plurality of light sources (2*a*) are arranged uniformly in the light source surface (2*b*).

15. The illumination device (1) according to claim 3, wherein the electrical voltage can be applied and varied by the adjustment means (5) to change the scattering cross section of the liquid crystals continuously when changing between operating states (B1, B2).

16. The illumination device (1) according to claim 4, wherein the overlap is at least 10%.

17. The illumination device (1) according to claim 4, wherein the overlap is more than 25%.

18. The illumination device (1) according to claim 4, wherein the overlap is more than 50% and optionally more than 75%.

\* \* \* \* \*